(12) United States Patent
Huang

(10) Patent No.: US 9,995,580 B2
(45) Date of Patent: Jun. 12, 2018

(54) LEVEL

(71) Applicant: Cheng-Hsiung Huang, Taipei (TW)

(72) Inventor: Cheng-Hsiung Huang, Taipei (TW)

( * ) Notice: Subject to any disclaimer, the term of this patent is extended or adjusted under 35 U.S.C. 154(b) by 154 days.

(21) Appl. No.: 15/286,672

(22) Filed: Oct. 6, 2016

(65) Prior Publication Data

US 2018/0100739 A1   Apr. 12, 2018

(51) Int. Cl.
*G01C 9/26* (2006.01)
*G01C 9/28* (2006.01)
*G01C 9/34* (2006.01)

(52) U.S. Cl.
CPC ............. *G01C 9/28* (2013.01); *G01C 9/34* (2013.01)

(58) Field of Classification Search
CPC ............ G01C 9/24; G01C 9/26; G01C 9/34
USPC ............................................. 33/379, 381, 382
See application file for complete search history.

(56) References Cited

U.S. PATENT DOCUMENTS

| | | | | |
|---|---|---|---|---|
| 3,832,782 A * | 9/1974 | Johnson | ............... | G01C 9/28 33/351 |
| 6,836,973 B1 * | 1/2005 | Eccles, Jr. | ............ | G01C 9/28 33/374 |
| 7,117,606 B2 * | 10/2006 | Brown | ............... | G01C 9/28 33/365 |
| 7,152,335 B2 * | 12/2006 | Nichols | ............... | G01C 9/18 33/390 |
| 7,520,065 B2 * | 4/2009 | Vernola | ............... | G01C 9/28 33/371 |
| 7,536,798 B2 * | 5/2009 | Silberberg | ............ | G01C 9/28 33/379 |
| 7,735,229 B2 | 6/2010 | Allemand | | |
| 7,913,406 B2 * | 3/2011 | Norelli | ............... | G01C 9/28 33/347 |
| 7,946,045 B2 | 5/2011 | Allemand | | |
| 8,336,221 B2 | 12/2012 | Steele et al. | | |
| 8,621,760 B2 * | 1/2014 | Norelli | ............... | G01C 9/28 33/347 |
| 8,631,584 B2 | 1/2014 | Steele et al. | | |
| 8,910,390 B2 | 12/2014 | Steele et al. | | |
| 9,021,710 B2 * | 5/2015 | Silberberg | ............ | G01C 9/28 33/371 |
| 9,228,832 B2 | 1/2016 | Steele et al. | | |

* cited by examiner

*Primary Examiner* — G. Bradley Bennett
(74) *Attorney, Agent, or Firm* — Bacon & Thomas, PLLC

(57) ABSTRACT

A level includes a top surface, a bottom surface parallel with the top surface, and a body accommodating at least one vial. The body has at least one through hole, at least one portion of the vial is exposed through the through hole, a close-ended locating hole is mounted at a side of the through hole, an opened-ended locating hole is mounted at another side of the through hole, and two sides of the vial are accommodated in the two locating holes respectively. A side of the opened-ended locating hole is mounted with a locating aperture so that a magnet is positioned in the locating aperture so as to fix the vial.

3 Claims, 5 Drawing Sheets

LEVEL

FIELD OF THE INVENTION

The present invention is related to a level, and more particularly to a level which has a vial-receiving aperture and a magnet-locating aperture combined with each other so that the level can be prepared cost-effectively and appear beautiful.

BACKGROUND OF THE INVENTION

A level is necessary for a practitioner employed in civil engineering and building, electrical and plumbing engineering, or interior decorating when measuring the angle of a datum plane. Among various kinds of levels, a level with a bubble vial is the most popular with the practitioner.

As shown in FIGS. 1-2, a level (1) is disclosed in Taiwan Utility Model Patent NO. M436831, which comprises a body (10) and at least one vial (20) mounted in the body. The body has a first side edge (101) and a second side edge (102), and the first side edge has at least one receiving portion (12) mounted with a magnetic element (13) therein to be magnetically placed on a surface containing iron. When the vial is installed in the body, the vial is inserted into the body through a first hole (161) so that two sides of the vial are mounted in the first hole and a second hole (162) respectively. And then, the first hole is filled with a layer of melted glue (19) to fix the vial in a hole (16). Finally, a screwdriver is used to tread an end plug (18) into the first hole so as to limit the vial in the hole by the obstruction caused by the end plus without coming off.

As further shown in FIGS. 3-5, a level tool (100) is present in U.S. Pat. No. 7,946,045, which includes a top wall (116) and a bottom wall (118). The top wall is mounted with multiple passageways (134) for accommodating vials (112), and the bottom wall is mounted with multiple holes (148) for accommodating magnetic inserts (146). After the vials are mounted in the passageways, plugs (140a, 140b, and 140c) are inserted into the passageways to allow the vials to be fixed in the passageways.

In addition to the foregoing ways that the plug (18 or 140) is inserted into the first hole (161) or the passageways (134), another traditional way is that silicone, wax, or glue is used to seal the first hole (161) or the passageways so as to fix the vial.

All above ways, including the plug insertion and the glue sealing, can lead to not only a rise in the manufacture cost, but also a bad appearance. In these ways, multiple slots are formed by drilling in various angles, and then multiple plugs each having a shape corresponding to each slots are produced. For example, the three plugs (140a, 140b, and 140c) in U.S. Pat. No. 7,946,045 are produced to match the holes with different shapes. As for glue sealing, besides the adhesive, i.e. silicone, wax, or glue, after calibrating the vial, a fast-acting adhesive is used to place the vial, and then the hole is filled with silicone or hot cement. In the above processes, the adhesion strength between the different materials should be considered, the used amount of the adhesive should be controlled, and the glue surface should be flat and beautiful. Therefore, the manufacture cost rises.

SUMMARY OF THE INVENTION

An objective of the present invention is to provide a level wherein the originally independent vial-receiving aperture and the originally independent magnet-locating aperture are combined with each other. Such combination can reduce the number of drill holes, and allow the magnet to be inserted into the hole after the vial is appropriately positioned so that the cost for preparing the traditional plugs and the cost for materials and manual labor in the traditional glue sealing can be omitted, and a beautiful appearance can be provided for the level. As such, the sense of worth of the product increases.

For achieving the foregoing objective, the invention provides a level, and the level comprises a top surface, a bottom surface parallel with the top surface, and a body accommodating at least one vial. The body has at least one through hole, at least one portion of the vial is exposed through the through hole, a close-ended locating hole is mounted at a side of the through hole, an opened-ended locating hole is mounted at another side of the through hole, and two sides of the vial are accommodated in the two locating holes respectively. A side of the opened-ended locating hole is mounted with a locating aperture so that a magnet is positioned in the locating aperture so as to fix the vial.

DETAILED DESCRIPTION OF THE INVENTION

The detailed description and preferred embodiments of the invention will be set forth in the following content, and provided for people skilled in the art so as to understand the characteristics of the invention.

Figure 6:
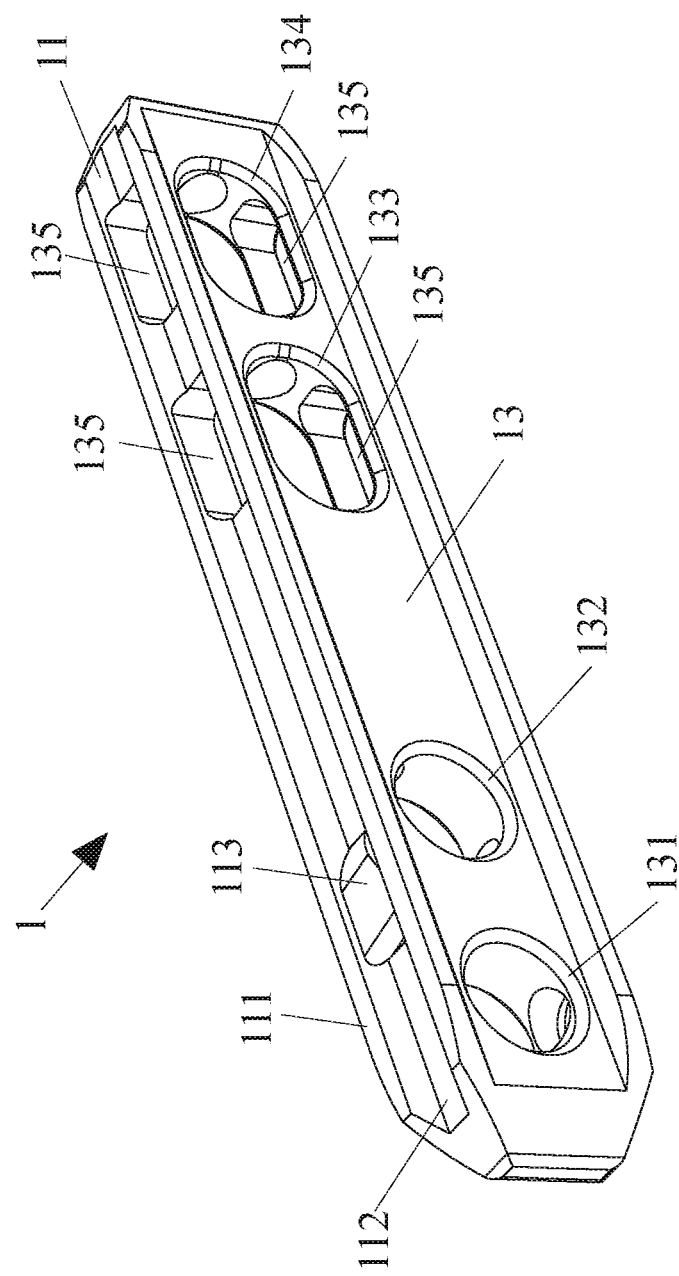
FIG. 6 is a schematic diagram of a level in an embodiment of the invention from a frontal perspective.
Figure 7:
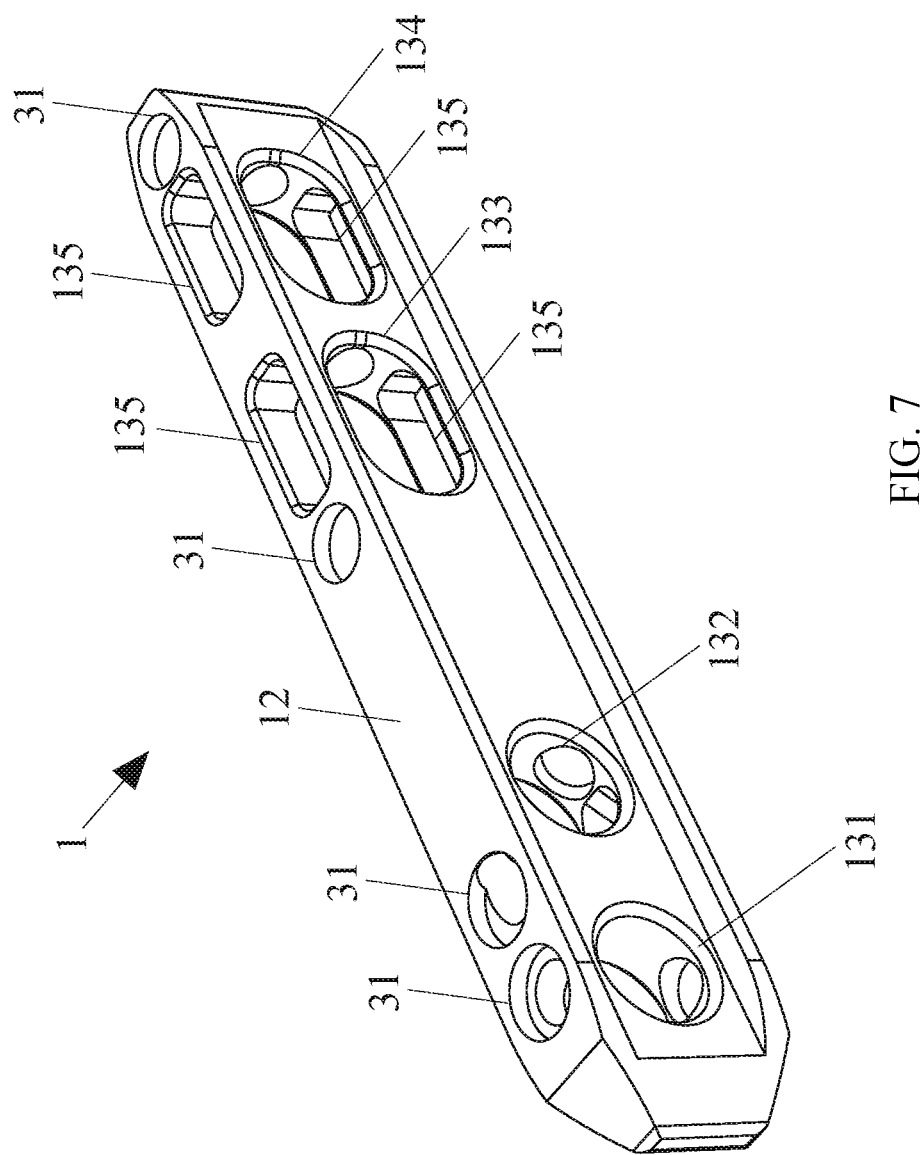
FIG. 7 is a schematic diagram of the above level from a back perspective.
Figure 8:
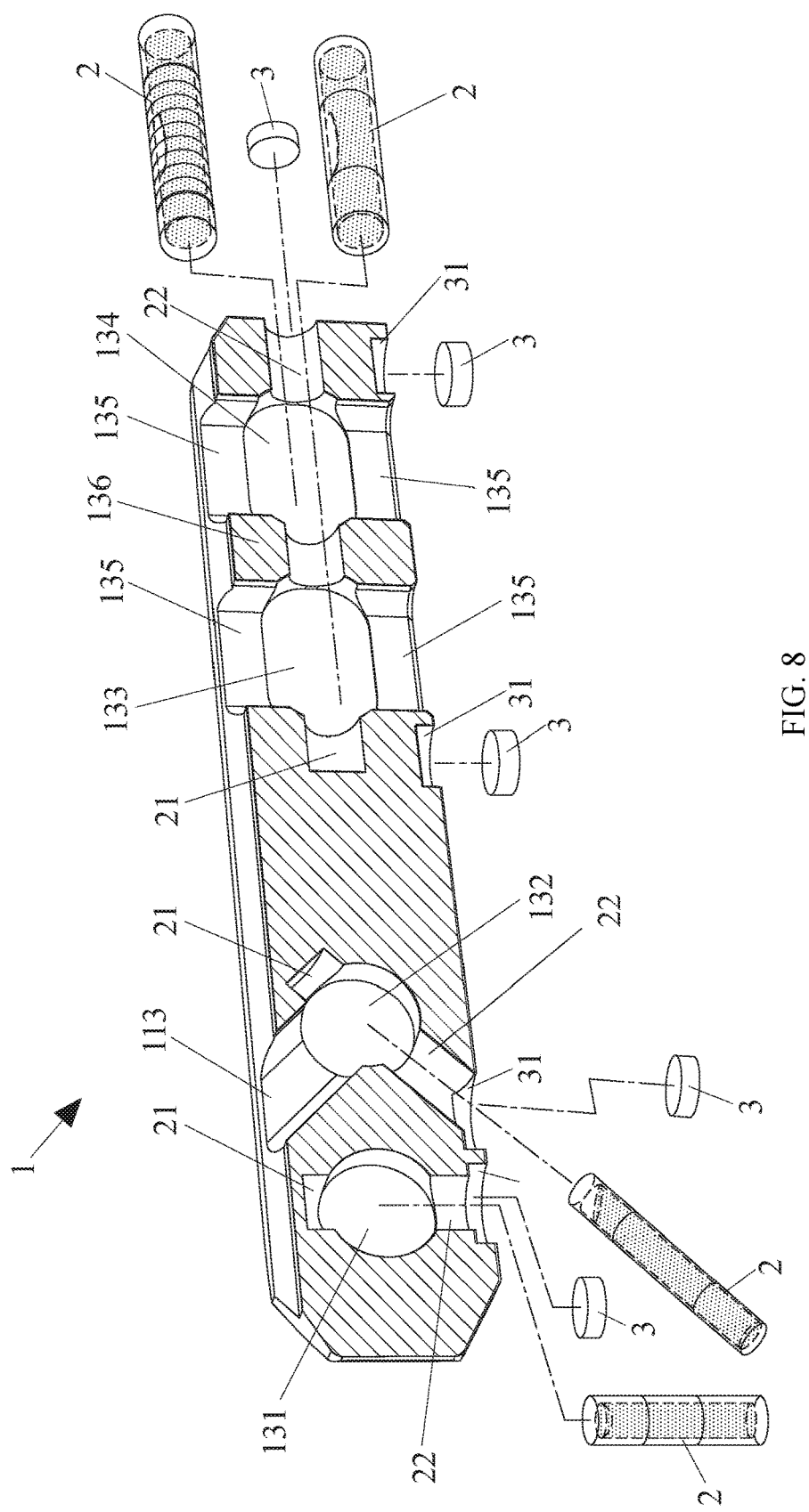
FIG. 8 is a cross-section diagram of the above level from a frontal perspective.

With reference to FIGS. 6-8, FIG. 6 is a schematic diagram of a level in an embodiment from a frontal perspective; FIG. 7 is a schematic diagram of the level from a back perspective; FIG. 8 is a cross-section diagram of the level from a frontal perspective.

The level (1) comprises a top surface (11), a bottom surface (12) parallel with the top surface, and a body (13) accommodating at least one vial (2). The top surface comprises two short dimensions (111) and a V-shaped bottom (112) concavely and downwards positioned between the two short dimensions. The short dimensions (111) are parallel with the bottom surface (12), and all of them can be used as a datum plane for measuring a ground or a wall surface. The V-shaped bottom (112) can be used as a datum plane for measuring a hose or the corner of a wall. The body (13) is positioned between the top surface and the bottom surface, and has through holes. In this embodiment, the through holes comprise two annular holes (131 and 132) at a left side and two elliptical holes (133 and 134) at a right side. These holes can be used as front view windows when a user observes the position of the bubble in the vial from the front side. That is, the positions of these holes are the position for mounting the vial. In this embodiment, a 90-degree vial is mounted in the first annular hole (131) at the left-most side, a 45-degree vial is mounted in the second annular hole (132), a common 0-degree vial is mounted in the first elliptical hole (133), and a 0-degree vial with slope markings is mounted in the second elliptical hole (134) at the rightmost side. The shapes of the holes are not limited to be annular or elliptical, as long as these shapes can fit the entire appearance of the level.

Through holes (135) are mounted at a position corresponding to the two elliptical holes (133 and 134) on the top surface (11) and the bottom surface (12), which can be used as top view windows when the user observes the positions of the bubbles in the two 0-degree vials from top to bottom. Likewise, a slantingly-viewing aperture (113) is mounted at a position corresponding to the second annular hole (132) on the top surface, which can be used as a view window when the user observes the positions of the bubbles in the 45-degree vial from top to bottom.

Figure 1:
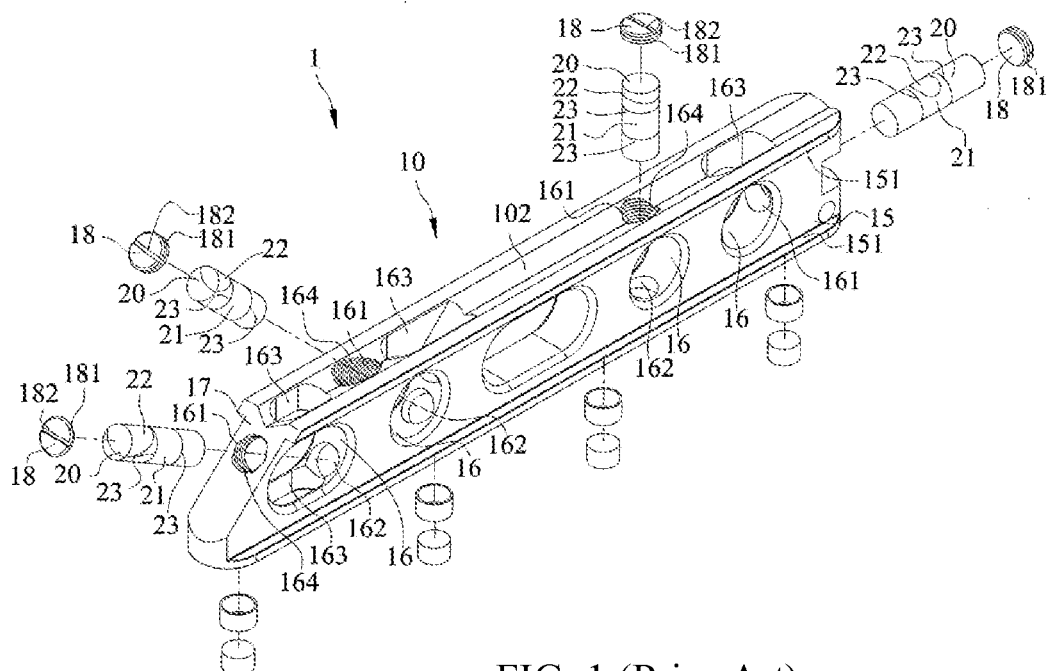
FIGS. 1-2 are schematic diagrams cited from Taiwan Utility Model Patent NO. M436831.
Figure 2:
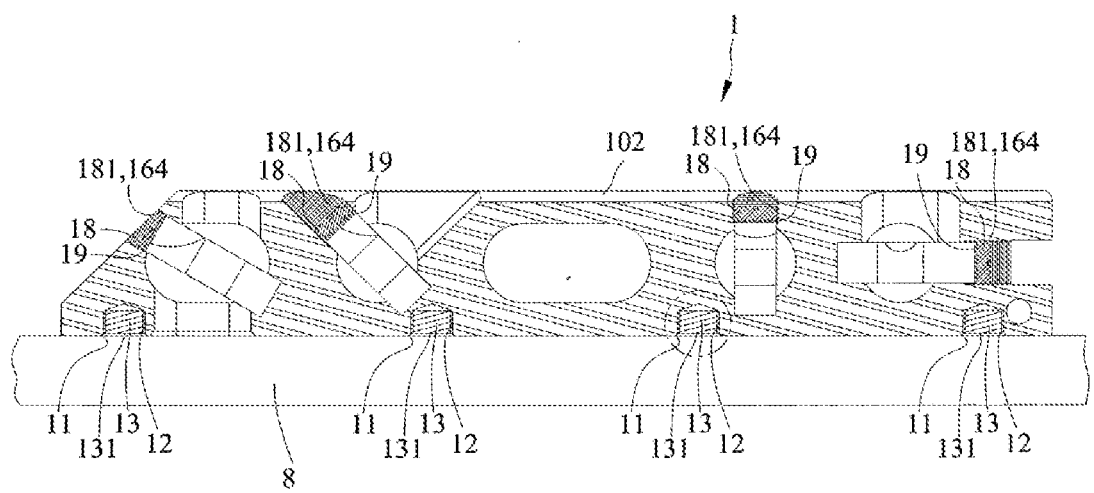
Figure 3:
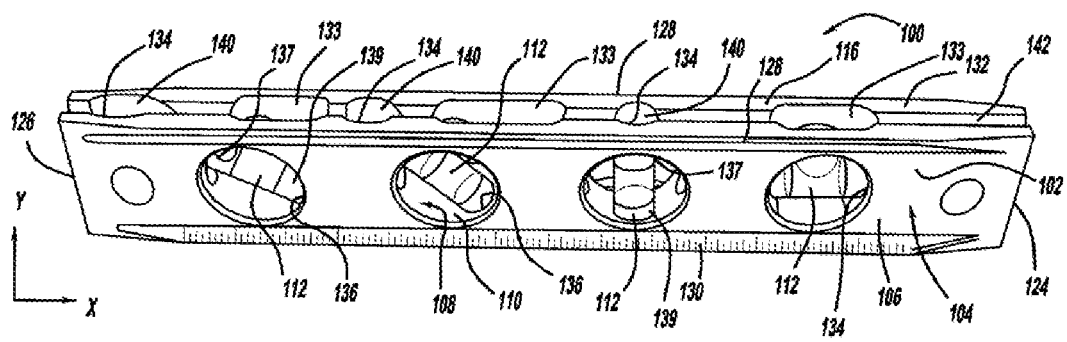
FIGS. 3-5 are schematic diagrams cited from U.S. Pat. No. 7,946,045.
Figure 4:
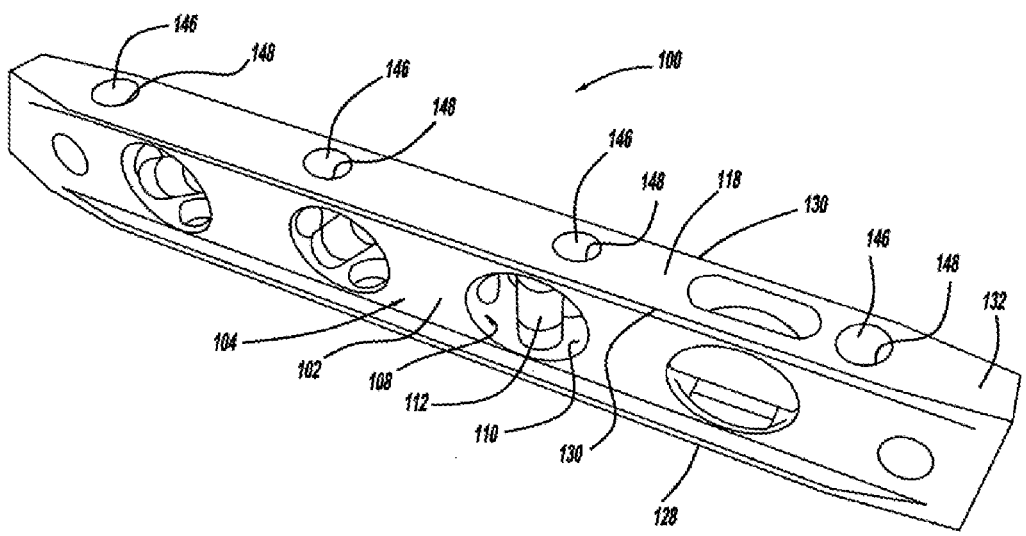
Figure 5:
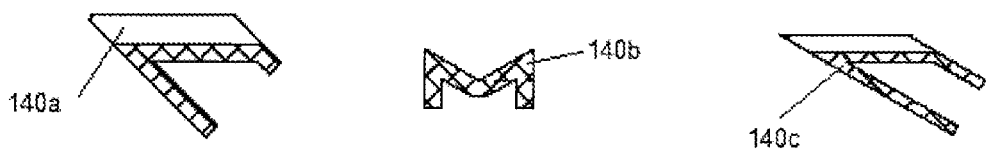

The above angles of the vials are not invariable, and can be varied as demand in different industries. Most levels are equipped with a 0-degree vial and a 90-degree vial, and a 45-degree vial is also common therein. Other special angle of a level may be considered. For example, FIG. 1 of U.S. Pat. No. 9,228,832 shows the angles of the vials are 0 degree, 90 degrees, 45 degrees, and 30 degrees, which is a typical example.

As shown in FIG. 8, the positions of the through holes are the positions for mounting the vials. Locating holes have various angles to match the vials with different angles to accommodate these vials. In this embodiment, the first annular hole (131) is configured to mount the 90-degree vial, so a closed-ended locating hole (21) and an open-ended locating hole (22) are formed by upwards drilling the bottom surface (12) to the first annular hole (131). By such a way, the two sides of the vial are accommodated in the two locating holes, and the position of the bubble in the vial is exposed through the first annular hole for the user's observation.

In this embodiment, a locating aperture (31) is mounted at an outer side of the foregoing open-ended locating hole (22). Therefore, during assembling of the level, the vial (2) is positioned between the closed-ended locating hole (21) and the open-ended locating hole (22), and then its angle is confirmed. After which, glue is dispensed in the locating aperture (31), and a magnet (3) is positioned in the same aperture to be fixed. By such a manner, the vial is fixed.

Similarly, the second annular hole is provided to deposit the 45-degree vial, and thus a closed-ended locating hole (21) and an open-ended locating hole (22) are formed by obliquely and upwardly drilling the bottom surface to the second annular hole (132). As previously mentioned, a locating aperture (31) is mounted at an outer side of the open-ended locating hole (22) and a magnet (3) is positioned in the same aperture to be fixed.

The elliptical holes (133 and 134) are provided to deposit the 0-degree vials. A closed-ended locating hole (21) and an open-ended locating hole (22) are formed by drilling a side surface of the body from exterior to inner to the two elliptical holes, and the drilling process is different the previously mentioned obliquely and upwardly drilling process for the 45-degree vial locating hole and the 90-degree vial locating hole. In this embodiment, an adjacent segment (136) adjacent to the elliptical holes supports the two vials connected together. As the above assembling process, the two vials are positioned in the closed-ended locating hole and the open-ended locating hole, and then a magnet (3) is located in a locating aperture (31) formed at an outer side of the open-ended locating hole (22). However, because of the high cost of the magnet, the magnet positioned at the side surface of the body can be substituted for glue or an end plug used in the traditional method.

As shown in FIG. 8, the open-ended locating holes for the 90-degree vial and the 45-degree vial are enclosed with the two magnets. Furthermore, there are two further magnets (3) positioned in two independent locating holes (31), and the two ones can provide the level with better balance when the level is used for measurement on an iron-containing surface. As such, the user can not worry about that the level falls down, and support the level with his/her hand. The amount and the position of the further magnets are not limited, and they depend on the level size and the user's demand.

As above described, in the embodiment, the locating hole is formed at the outer side of the open-ended locating holes. When the magnet is mounted in the locating hole, the vial is also fixed. This is different from the traditional way, and the embodiment further exhibits the following advantages:

At the top surface of the level is merely the window for observation of the bubble position in the vial, but no any traditional vial-locating hole. This can decrease total processes for drilling, such as the plug fabrication or the glue sealing, so the manufacture cost is also decreased. Since the total processes for drilling are decreased and the plug is omitted, the appearance of the level top surface is beautiful. Accordingly, a beautiful appearance can be provided for the level.

The drilling for the locating hole and the vial-locating holes can be carried out in one step, not in multiple independent steps. Additionally, the magnet is used as a fixing element, which leads to omission of plug insertion or glue sealing. Obviously, the manufacture cost is decreased.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A level, comprising:
   a top surface;
   a bottom surface being parallel with the top surface; and
   a body accommodating at least one vial;
   wherein the body has at least one through hole, at least one portion of the vial is exposed through the through hole, a close-ended locating hole is mounted at a side of the through hole, an opened-ended locating hole is mounted at another side of the through hole, two sides of the vial are accommodated in the two locating holes respectively, and a side of the opened-ended locating hole is mounted with a locating aperture;
   whereby a magnet is positioned in the locating aperture so as to fix the vial.

2. The level as claimed in claim 1, wherein the through hole is used as a view window for observation of a position of a bubble in the vial.

3. The level as claimed in claim 1, the vial is positioned in the through hole.

* * * * *